United States Patent [19]

Slocum

[11] Patent Number: 5,281,032

[45] Date of Patent: Jan. 25, 1994

[54] SELF-COMPENSATING HYDROSTATIC BEARINGS FOR SUPPORTING SHAFTS AND SPINDLES AND THE LIKE FOR ROTARY AND TRANSLATIONAL MOTION AND METHODS THEREFOR

[76] Inventor: Alexander Slocum, 26 Gallin Dr., Concord, N.H. 03301

[21] Appl. No.: 830,638

[22] Filed: Feb. 4, 1992

Related U.S. Application Data

[63] Continuation-in-part of Ser. No. 610,535, Nov. 8, 1990, Pat. No. 5,104,237.

[51] Int. Cl.$^5$ .............................................. F16C 32/06
[52] U.S. Cl. .................................... 384/118; 384/100
[58] Field of Search ................ 384/12, 100, 118, 115, 384/114

[56] References Cited

U.S. PATENT DOCUMENTS 3,754,799 8/1973 Hedberg ........................... 384/12 X
4,685,813 8/1987 Moog ................................. 384/118
4,710,035 12/1987 Vaughn ........................... 384/118 X
5,104,237 4/1992 Slocum ........................... 384/100 X

FOREIGN PATENT DOCUMENTS 143297 8/1980 Fed. Rep. of Germany ...... 384/100
1141242 2/1985 U.S.S.R. ............................ 384/118

Primary Examiner—Thomas R. Hannon
Attorney, Agent, or Firm—Rines and Rines

[57] ABSTRACT

A self-compensating rotary hydrostatic bearing and method in which preferably circular annular pressurized-fluid-receiving grooves provided in the opposed housing bearing surfaces regulate the fluid fed to longitudinal recess pockets formed in the opposing bearing surfaces, at an angle to avoid the occurrence of turbulence, to provide a thin film or layer of pressurized fluid in the gaps between a shaft and the opposing bearing surfaces; the regulation establishing differential pressures in the opposing bearing surface pockets to compensate for loads applied to opposite sides of the bearing.

23 Claims, 5 Drawing Sheets

DIRECTION OF SHAFT ROTATION

SELF-COMPENSATING HYDROSTATIC BEARINGS FOR SUPPORTING SHAFTS AND SPINDLES AND THE LIKE FOR ROTARY AND TRANSLATIONAL MOTION AND METHODS THEREFOR

This application is a continuation-in-part of parent application Ser. No. 610535 filed Nov. 8, 1990 for Self Compensating Hydrostatic Linear Motion Bearing, now U.S. Pat. No. 5,104,237.

The present invention relates to rotary motion bearings that are supported by a thin film of pressurized fluid—liquid or gaseous—including among other fluids water and air, and hereinafter sometimes generically referred to and interchangeably as "fluidstatic" or "hydrostatic" bearings.

More specifically, the invention is concerned with a system that includes a round, cylindrical, or arcuate bearing rail which guides the rotary (and/or linear) motion of a round internal coaxial shaft that maintains its distance from the concentric surrounding cylindrical bearing housing surface sections by means of a thin pressurized film of fluid emanating from pockets in the cylindrical bearing housing surfaces that surround the shaft and are geometrically opposed to each other at opposing regions thereof. The flow of fluid to the pockets is regulated to allow a differential pressure to exist between the pockets in response to a force being applied to the shaft or bearing housing. As a force is applied to the shaft or bearing housing, the bearing gap on the side or region to which the force is applied decreases, and the bearing gap on the other side or region increases. The resistance to fluid flow out of the bearing pocket is inversely proportional to the cube of the gap dimension, which means that a compensated opposed pocket bearing behaves, in electrical analysis, like two resistors in series with one another and in parallel with another series set. Hence, as the load is applied, the resistance of the fluid out of the bearing pocket on the load side increases, and decreases out of the other side. The result is that the pressure increases in the pocket on the side to which the load is applied until the load and the differential pressure generated between the two pockets balance. The bearing therefore compensates for the applied load. The resistance of fluid flow into the pockets is herein referred to as compensation.

BACKGROUND

As explained in said parent application, in the prior art, three types of compensation have been proposed. Fixed compensation involved using a capillary or orifice to act as a fixed value resistance. Variable compensation typically constituted the use of a diaphragm and/or valves to provide a flow inversely proportional to the pocket resistance, thereby creating a larger pressure differential than created with the use of a fixed compensation device. Both of these types of compensation, however, must be tuned to the bearing gap and require the manufacture and installation of additional mechanical components subject to clogging and manufacturing errors.

As smaller and smaller bearing gaps are sought in order to increase the performance of the bearing, manufacturing errors make the use of either of these types of compensation more and more difficult by requiring hand-tuning of the compensation device. For high speed machines where a bearing failure (e.g., due to a clog or an improperly hand-tuned bearing) could result in a very non-optimal machine operating condition, there has been a great reluctance to use conventional hydrostatic bearings.

In addition, there is a growing concern about environmental issues, both in terms of pollution, human skin dermatitis, and heat generated by the bearing which causes thermal growth errors in the machine. All these issues are a direct result of using oil in hydrostatic bearings. If a more environmentally friendly fluid, such as water, could be used, then there would not be a disposal problem with the fluid, and working with the machine (e.g., assembly and testing and service) would not result in dermatitis problems for workers. Fire hazards would also be virtually eliminated, as would thermal growth errors. Furthermore, since many processes now use water-based coolants, there would be less of a chance for machine or process degradation if some of the process control fluid leaked into the bearing fluid or vice versa. In addition, one of the most common types of bearing failure may be avoided, which is the wear of rolling element bearings caused by a cleaner blowing dirt off the machine and invariably causing some of the dirt to be blown by the bearing seals and into the bearings. A fluidstatic bearing, on the other hand, upon startup, will clean itself.

The solution is not so simple, however, as merely replacing the oil with water in a conventional bearing design. Firstly, because water has one-tenth the viscosity of a typical light hydrostatic oil (e.g., ISO 10 oil), ten times the flow will result if the water is used in the same bearing; and in higher speed applications (e.g., spindles) turbulence will result causing substantially higher rates of heat generation than occur with the use of oil.

Since the flow is proportional to the cube of the bearing gap, obtaining a flow rate with water that is equivalent to that of the oil bearing, requires that the water bearing have about one-half of the gap of the oil bearing. The Reynolds number, which is an indication of turbulence, is proportional to the bearing gap. Fortunately, the four-times greater heat capacity of water (as compared with a typical hydrostatic oil) means that by reducing the gap by one-half or more, allows for minimal heat generation and the avoidance of turbulence in moderate speed applications optimal, for example, for large grinding machines and some machine tool spindles. Other applications such as lapping and polishing machines, run at relatively low speeds; but they require extreme accuracy in the presence of extremely adverse conditions (e.g., the caustic solution used to polish wafers for integrated circuit production, for example, or for production of memory disc substrates and the like).

A third type of compensation, as also described in said parent application, is called self-compensation because it uses the change in bearing gap to allow the bearing to change the flow of fluid to the pockets, by itself. Existing self compensation methods have utilized linear passageways on the face of the bearing and have been directed primarily to applications in spindles, as later more fully discussed. These designs have not, however, proven themselves to provide acceptable performance in the commercial sector because of inefficient flow patterns that are difficult analytically to determine, particularly the flow field near the end of the linear grooves, often resulting in improper resistance design and which then require hand-tuning of the compensator. Difficulty has also been experienced with prior linear groove self-compensation units because the geometry has not always been realistically implementable or deterministic enough to allow for easy design and build-with-confidence-that-it-will-work scenarios. In addition, methods need to be developed to introduce the fluid into the bearing to prevent the occurrence of turbulence which would cause unacceptable increases in heat generation.

Underlying the present invention, is the discovery that through the use of the general type of bearing construction of the parent invention, modified for shaft or spindle applications of the present invention, and embodying self-compensating units in the form of a pressurized annulus that feeds the fluid to a hole in its center which is then connected to a bearing pocket at an opposing region of the shaft via a hole (that for high speed motion applications of the present invention preferably intersects the pocket at an angle such that the fluid that enters the pocket flows into the pocket with a principal component (tangential) in the direction of motion), the limitations of such prior art approaches are admirably eliminated. The annulus is easy to manufacture and is more structurally stable than linear passages; and, furthermore, the fluid flow from the circular annulus to the center feed hole can be analytically determined with great accuracy. The intersection angle of the feeder hole to the pocket can be found by using stream functions to visualize the flow as later explained. When flow velocity reversal is avoided, the chance for occurrence of turbulence can be minimized. Typically the appropriate angle is from 30 to 60 degrees. For bi-directional bearings, two fluid paths to two feed holes, switched by a reciprocating valve, may be used as later more fully discussed.

OBJECTS OF INVENTION

Accordingly, it is an object of the present invention to provide a new and improved self-compensating hydrostatic rotary motion bearing and method, void of prior art disadvantages, and that involves a novel mechanism to regulate the flow of pressurized fluid into opposed pocket hydrostatic bearings, whereby the regulation of fluid flow is proportional to the bearing gap and is controlled by an analytically representable system on the surface of the bearing itself; and, for the case of high speed bearings, to introduce the fluid into the bearing pocket in the direction of bearing motion so that the change for occurrence of turbulence is minimized.

Another object is to provide a novel bearing construction that is the rotary form of the linear self-compensating bearing of said parent application in which the fluid resistance, or compensation, into the bearing pocket is formed by a geometric pattern on the bearing housing surface itself, such that at the nominal equilibrium position of the bearing, the resistance of the mechanism will be in desired proportion to the fluid resistance out of the bearing pocket regardless of the magnitude of the nominal equilibrium gap; thereby obtaining an easy-to-manufacture hydrostatic bearing that requires no special hand tuning of its performance.

Another object is to provide an inexpensive modular bearing design that allows machine tool builders to utilize hydrostatic bearings with the same ease that they heretofore have utilized modular rolling element bearings; but because the bearings are hydrostatic they will attain an order of magnitude increase in performance.

Still a further object is to provide such a novel bearing in which it is insured that all regions of the bearing receive sufficient fluid flow even when the bearing is moving at high speed.

These and still further objectives are addressed hereinafter are more particularly delineated in the appended claims.

SUMMARY

In summary, however, from one of its viewpoints, the invention embraces, in a fluidstatic bearing having opposed cylindrical housing bearing surface sections concentrically surrounding a cylindrical shaft extending coaxially therealong and therebetween, with each bearing surface section having similar and symmetrical pockets in the surface from which pressure fluid emanates to provide a thin film of fluid interposed in the gaps between the shaft and the housing surfaces, a method of self-compensating for load variation on either side of the bearing, that comprises, introducing on each cylindrical bearing surface section, longitudinally spaced from the corresponding surface pocket, a pressurized fluid-receiving groove of analytically representable geometry from which the fluid is fed externally of said surfaces from each groove to the pocket of the oppositely disposed cylindrical bearing section surface, and with the resistance to fluid flow out of the groove being adjusted to equal a proportion of the resistance to fluid flow out of the opposite surface pocket when the bearing is at nominal equilibrium position and gap, unloaded by external forces, whereby as external forces are applied, the fluid flow is regulated to self-compensate for the load proportionately to variation in the bearing gap caused by the applied load, with a differential pressure being established in the opposite pockets to compensate for such applied load. It is preferred, moreover, particularly for high speeds, that the angle that the fluid feed intersects the pocket is adjusted to introduce the fluid generally along the direction of motion of the bearing to minimize the chance for the occurrence of turbulence, Preferred and best mode designs are hereinafter described.

DRAWINGS

The invention will now be described with reference to the accompanying drawing in which.

THE INVENTION

Figure 1:
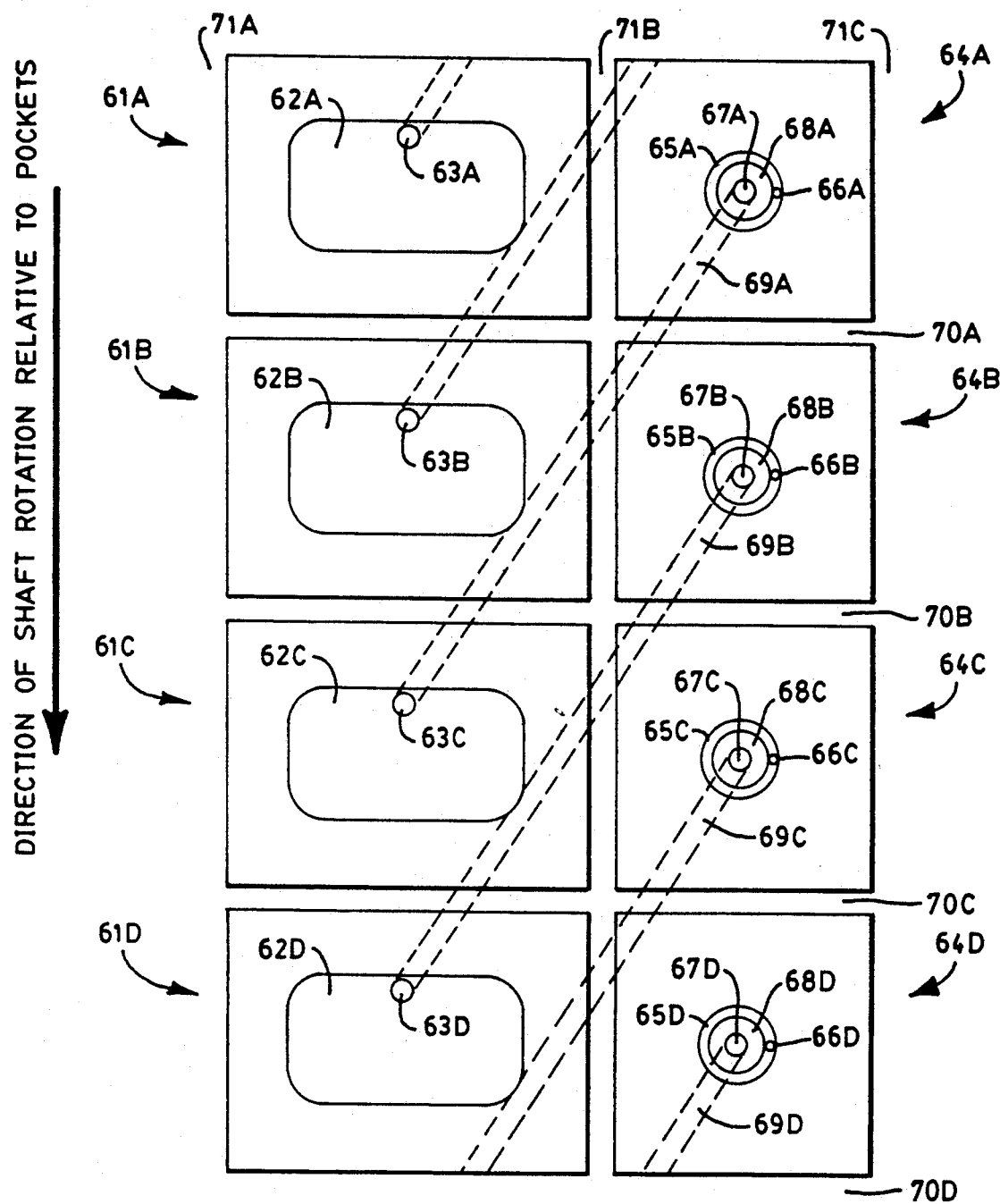
FIG. 1 is a flat projection (unwrapped) of the arcuate cylindrical surface sections of a bearing constructed in accordance with the present invention, illustrating the pockets and and compensating areas.

The drawings illustrate apparatus for supporting a cylindrical shaft using a pressurized thin fluid film to provide accurate frictionless motion capability. To maximize versatility, it is desired to provide modular cylindrical bearing housings; and to provide accurate rotary motion, at least four degrees of freedom must be restrained. Two of the four degrees of freedom are translational, and two of the degrees of freedom are rotational. To maximize resistance to rotational motions, the cylindrical bearings are spaced axially along the shaft. Alternatively, a single rotary bearing may be combined with thrust bearings that will resist the tilt motions (e.g., a single rotary bearing supporting a shaft that is connected to a flange or table, later described, which is then restrained axially by bearings, such as modular self-compensating bearings of the parent application). The latter option will result in the formation of a very accurate rotary table. The former option combined with a pure thrust bearing, which may also be self-compensating, will result in the formation of an accurate spindle for use, for example, in machine tools and grinding machines and the like.

Below is the output from a spreadsheet that uses the formulae presented in said self-compensating hydrostatic bearing parent application that have now been weighted to reflect the projection of a circular pocket onto a portion of a shaft to design a self compensating cylindrical bearing for a spindle shaft in accordance with the present invention, and where the working fluid is preferably water.

| | | |
|---|---|---|
| Speed w (rpm, rad/sec) | 3,600 | 377 |
| Surface speed v (m/s) | 11 | |
| Diameter (m) | 0.060 | |
| Drain groove width (m) | 0.005 | |
| Circumferential pad dimension | 0.042 | |
| Pad length | 0.100 | |
| Supply Pressure Ps (N/m 2, psi,atm) | 2,028,600 | 294 |
| Viscosity mu (N-s/m 2) (water) | 0.001 | |
| Density p | 997 | |
| Heat Capacity Cp | 4180 | |
| Pocket depth hp (m, in, $\mu$m) | 0.000080 | 0.003150 |
| Nominal bearing gap h (m, in, $\mu$m) | 0.000015 | 0.000591 |
| Equivalent rectangular bearing characteristics | | |
| Width a (m, in, mm) | 0.0421 | 1.66 |
| Length b (m, in, mm) | 0.1000 | 3.94 |
| Land width 1 (20% of width) (m, in, mm) | 0.0150 | 0.59 |
| pocket circumferential length | 0.0121 | |
| Pocket radius rp (m, in, mm) | 0.0040 | 0.16 |
| Fluid resistance across bearing lands Rbearing (Nsec/m 5) | 2.77E + 11 | |
| Effective pad area (cm 2, in 2, mm 2) | 21.24 | 3.29 |

-continued

| | | |
|---|---|---|
| Land area (m 2) | 0.02 | |
| Pocket area | 0.00 | |
| Power | 196.97 | |
| Total flow (lpm) | 1.90 | |
| Temperature rise | 1.49° C. | |
| Reynolds number on lands | 169.14 | |
| Reynolds number in pocket | 902.06 | |
| Chord width, chord ratio (cr) | 0.030 | 0.70231636 |
| Total length with drain grooves | 0.162 | |
| Results are for each bearing pad pair: | Self compensating: | |
| gamma = Rrestrictor/Rbearing | 3 | |
| Load capacity at 50% gap closure (N, lb) | 2,687 | 604 |
| Initial stiffness (N/micron, lb/microinch) | 454 | 2.59 |
| Stiffness at 25% gap closure (N/micron, lb/microinch) | 389 | 2.22 |
| Stiffness at 50% gap closure (N/micron, lb/microinch) | 165 | 0.94 |
| Flow (liters per minute) | 0.95 | |
| Pump power (Watts) | 32.08 | |
| Circular self compensating restrictor geometry | | |
| Proportionality factor gamma | 3 | |
| Restrictor resistance Rrestrictor desired (Nsec/m 5) | 8.30E + 11 | |
| Rrestrictor*pi*h 3/6mu | 1.4670 | |
| D2 (m, mm) | 0.0173 | 17.3 |
| D1 (m, mm) | 0.0040 | 4.0 |
| Compensator land width (mm) | 6.67 | 6.7 |
| Leakage resistance calculations | | |
| D4 (m, mm) | 0.0421 | 42.1 |
| D3 (m, mm) | 0.0233 | 23.3 |
| Compensator land width (mm) | 9.93 | 9.4 |
| Leakage resistance Rleakage (Nsec/m 5) | 3.34E + 11 | |
| Rleakage/Rrestrictor | 0.40 | |

Note the very low 1.49° C. temperature rise at 3600 rpm. The temperature rise is an order of magnitude less than found in most ball bearings and 30 times less than would be expected in an oil hydrostatic bearing.

Figure 2:
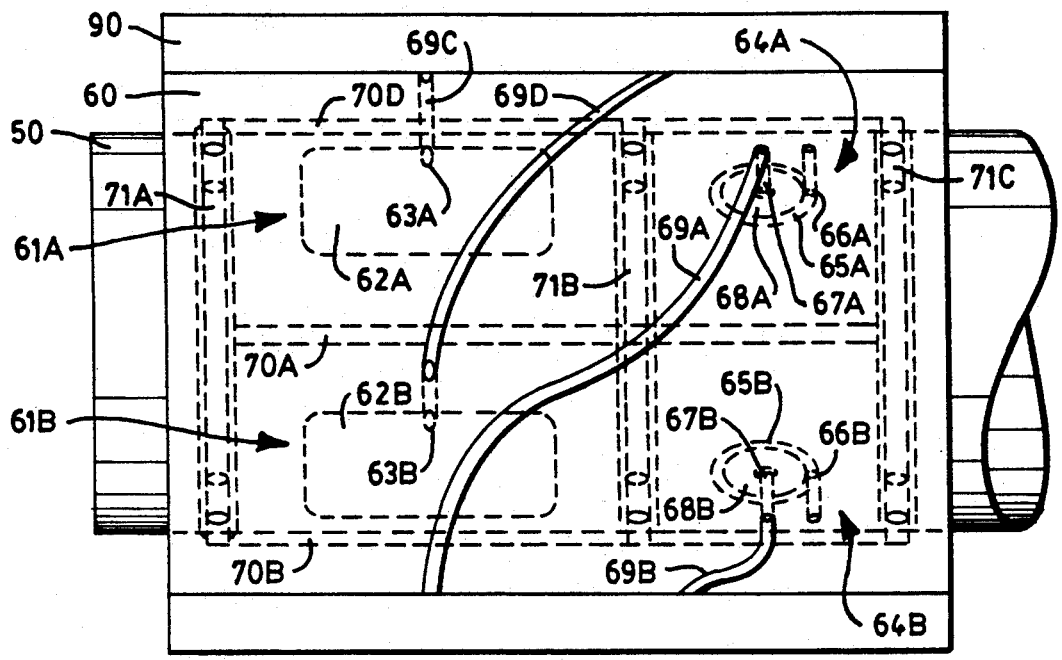
FIG. 2 is an external side view of the inner sleeve of the bearing housing showing the fluid passages.
Figure 3:
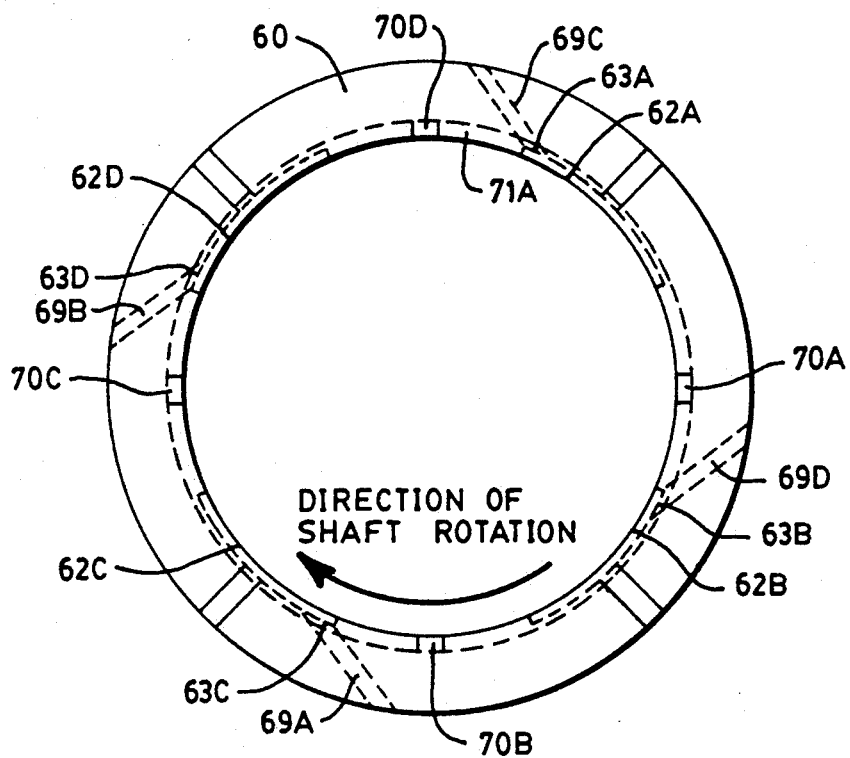
FIG. 3 is a cross section view of the bearing sleeve shown in FIG. 2 which shows the means by which the fluid is introduced into the bearing pockets at an angle to minimize the chance for occurrence of turbulence.

As shown in FIG. 2, a cylindrical shaft 50 of the invention moves coaxially inside a concentric outer cylindrical bearing insert 60 which is shrunk-fit inside an outer cylindrical housing 90 (cut away in the figure to show more clearly the insert). The motion of the shaft 50 about (or along) the horizontal or X axis is guided by arcuate or cylindrical (or portions of a cylinder herein termed cylindrical) longitudinally extending bearing pad surface sections 61A, 61B, 61C, and 61D; respectively. As more particularly shown in the pad lay-out of FIG. 1, but also in part in FIGS. 2, 3, and 5, the cylindrical bearing pad surface sections 61A, 61B, 61C, and 61D contain similar longitudinally extending depressed pocket regions 62A, 62B, 62C, and 62D, respectively, that are filled with high pressure fluid from apertures 63A, 63B, 63C, and 63D as later explained. Fluid flow to the pockets 62C, 62D, 62A, and 62B is regulated by respective similar opposed cylindrical self-compensation pad units or sections 64A, 64B, 64C, and 64D, containing circular annular grooves 65A, 65B, 65C, and 65D that are pressurized with fluid from supply source 66A, 66B, 66C, and 66D and surround inner respective annular compensation lands 68A, 68B, 68C, and 69D. As taught in said parent application for the linear or planar bearing surfaces, the inner diameter of the annular grooves 65A, 65B, 65C, and 65D and the holes 67A, 67B, 67C, and 67D, respectively, are chosen such that the fluid resistance from the annular grooves to the holes is a desired proportion of the fluid resistance from the bearing pockets 62C, 62D, 6AC, and 62B, respectively, to the axial drainage grooves 70A, 70B, 70C, and 70D and circumferential drainage grooves 71A, 71B, and 71C. The drainage grooves act to drain the fluid from the bearing which prevents undesired crosstalk between the bearing pockets and compensation lands.

The fluid in the annular grooves 65A, 65B, 65C, and 65D is at high pressure from the sources 66A, 66B, 66C, and 66D; thus it will always want to flow to lower pressure regions. Hence flow will occur across the respective annular compensation lands 68A, 68B, 68C, and 68D to the inner (shown center) holes 67A, 67B, 67C, and 67D which are connected to the pockets 62C, 62D, 62A, and 62B via passageways 69A, 69B, 69C, and 69D. The resistances to flow across the compensator lands depends on the inner diameter of the annular grooves 65A, 65B, 65C, and 65D and the holes 67A, 67B, 67C, and 67D, as described in the above mentioned parent hydrostatic bearing application.

After crossing the compensation lands 68A, 68B, 68C, and 68D, the fluid enters the respective central holes 67A, 67B, 67C, and 67D, and then travels through the respective passageways 69A, 69B, 69C, and 69D in the bearing insert 60. The radial clearance between the shaft 50 and the insert 60 is typically on the order of 0.01 mm. Thus, so long as these passageways are at least a few millimeters in diameter, the passageway resistance will be insignificant compared to the resistance of the compensation lands. The passageways direct the fluid from the self compensation units 64A, 64B, 64C, and 64D to the opposite bearing pockets 69C, 69D, 69A, and 69B, respectively. Hence the fluid is fed to the bearing surface on the opposite region or side of the shaft from the self-compensation unit. The fluid keeps the bearing pockets 62C, 62D, 62A, and 62B pressurized; and then the fluid then flows out of the pockets to the axial drainage grooves 70A, 70B, 70C, and 70D and circumferential drainage grooves 71A and 71B.

Figure 4:
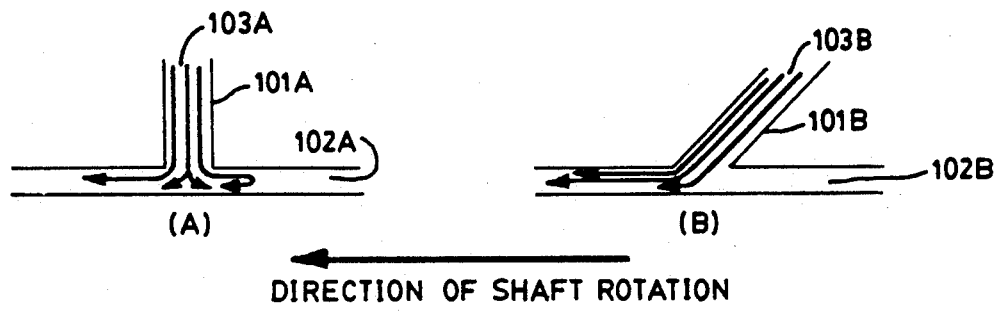
FIGS. 4A and 4B are schematic diagrams illustrating how streamfunctions can be used to model the flow of fluid into the bearing, thereby allowing the designer to choose the entrance angle so that the flow will not curl or reverse back on itself which causes turbulence to occur.

For low speed operations, the angle at which the passageways 69A, 69B, 69C, and 69D intersect the pockets 62C, 62D, 62A, and 62B at entrance holes 63C, 63D, 63A, and 63B is not so critical. Note that the before mentioned spreadsheet output presented above includes calculation of the Reynolds number. Turbulence can generally be avoided if the Reynolds number is kept below 2000, but this implies that there are no deliberate introductions of turbulence. Turbulence is the occurrence of many tiny vortices, and thus turbulence can be triggered by generation of vortices. As shown in FIG. 4, if the angle is 90 degrees at which a passageway 101A intersects a pocket 102A, streamlines 103A can be used to show that vortices will be generated by the viscous shear of the fluid by the shaft which causes the fluid to curl or reverse or double-back on itself, as shown in FIG. 4(A), and leads to the formation of a vortex and hence turbulence. As also shown in FIG. 4(B), if the angle is on the order of 45 degrees (30-60 degrees is typically the range depending on the shaft speed) at which a passageway 101B intersects a pocket 102B, streamlines 103B can be used to show that all the flow will blend in with the direction of the shaft rotation. By adjusting the angle, the flow is directed in a direction substantially tangent to the shaft and generally in a direction of the surface velocity of the shaft; and the flow, consequently, will not double-back on itself, obviating the generation of turbulence and insuring laminar flow.

Figure 6:
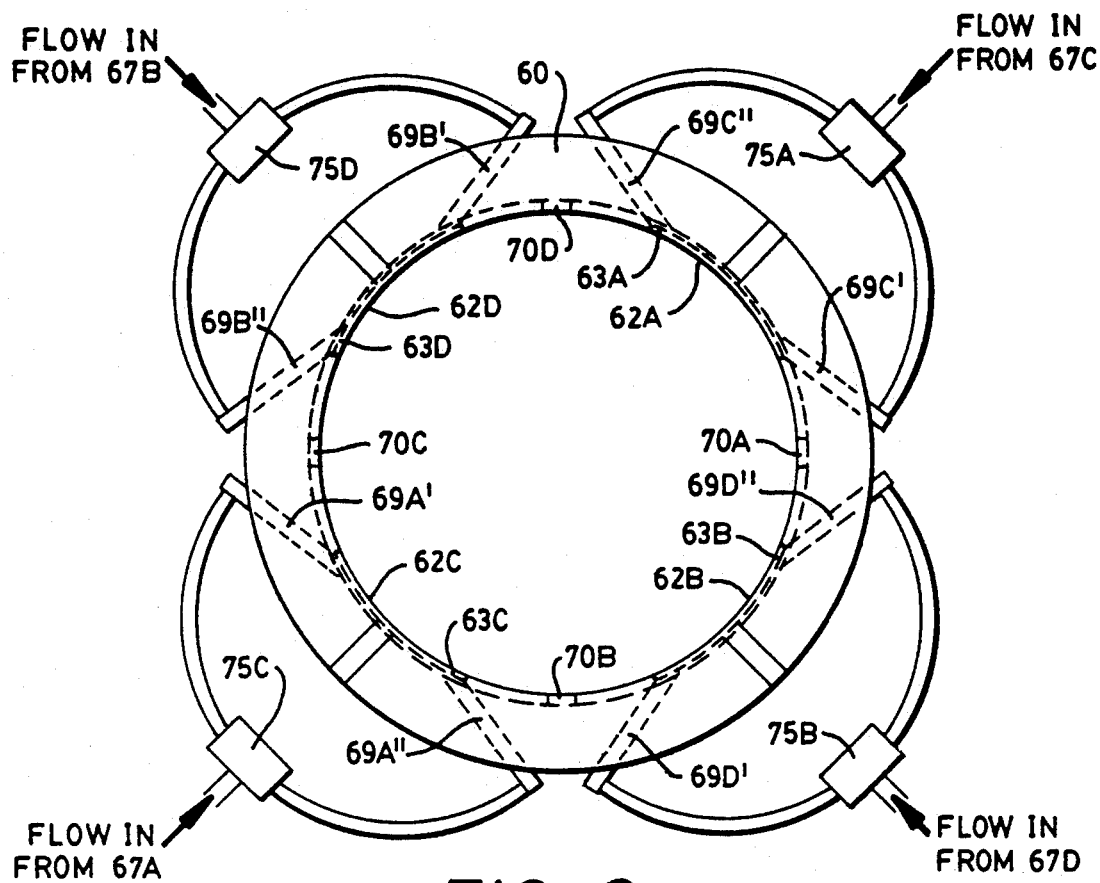
FIG. 6 is a cross section view of the bearing sleeve shown in FIG. 2 illustrating bidirectional operation, wherein the fluid is introduced into the bearing pockets, at an angle to minimize the chance for occurrence of turbulence, via one of two passageways which are switched with a valve to accommodate spindle rotation direction changes.

The invention is extremely useful to designers of grinding, lapping, and polishing machines particularly, because the abrasives used in these machines get into rolling element bearings and cause them to fail. Also, machines of this type have the most stringent accuracy requirements. In general, these types of machines have spindles which are unidirectional; hence they only require the passageways from the compensators to the pockets to intersect the pockets on one side. There may, however, be some bidirectional spindle applications. FIG. 6 shows how such operation may be obtained with valves 75A, 75B, 75C, and 75D used to direct the flow from the passageways 67C, 67D, 67A, and 67B into the appropriate passageway 67C', 67D', 67A', and 67B' or 67C", 67D", 67A", and 67B" to deliver the fluid to the pockets 62A, 62B, 62C, and 62D according to which way the spindle is rotating.

Figure 7:
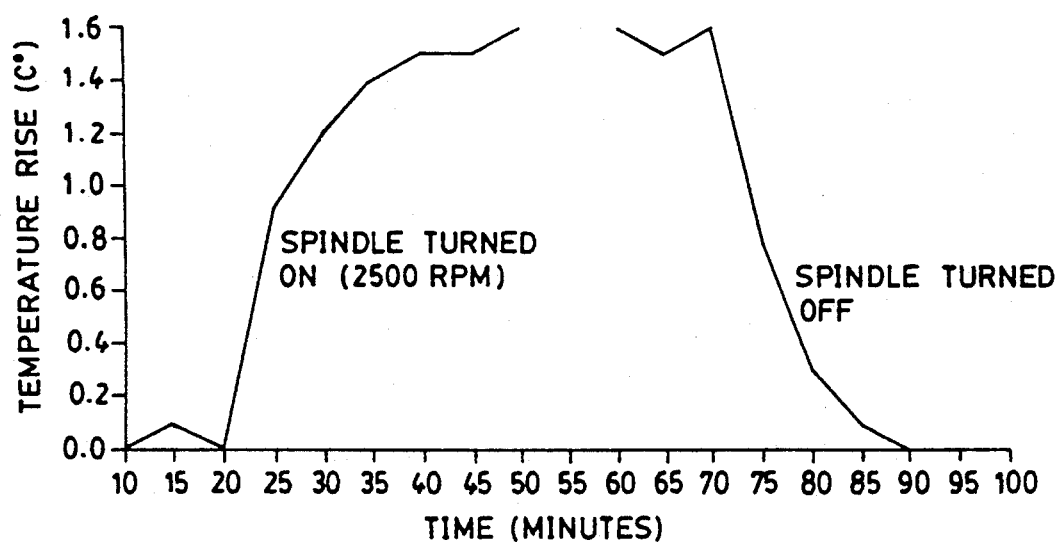
FIG. 7 is a chart of spindle temperature rise for a 60 mm diameter shaft, water hydrostatic spindle running at 2500 rpm.
Figure 8:
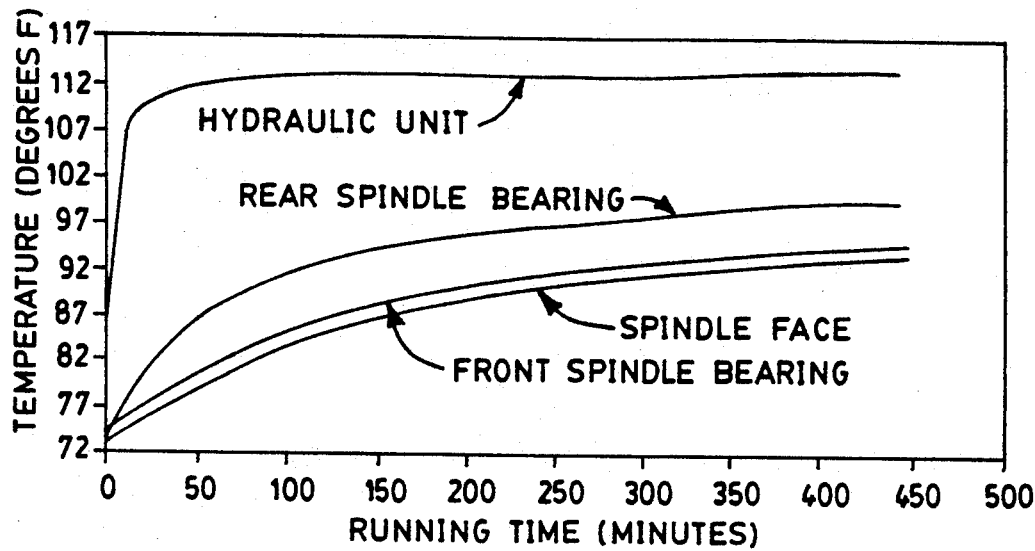
FIG. 8 is a chart of spindle temperature rise for a 60 mm diameter precision grease lubricated ball bearing spindle running at 2000 rpm.

The results of the application of the design of the present invention is illustrated by FIG. 7 which is a chart of spindle temperature rise for a 60 mm shaft diameter, water hydrostatic spindle running at 2500 rpm. Note that for a turbulent flow bearing, the temperature rise would be an order of magnitude higher than the 1.6° C. rise indicated in FIG. 7, on the order of 16° C. As another comparison, consider FIG. 8 which is a chart of spindle temperature rise for a 60 mm diameter prior art precision grease lubricated ball bearing spindle running at 2000 rpm (the hydraulic unit was used to power a clamping device in the spindle), which provides about a 25° F. higher temperature rise than a water hydrostatic spindle of the invention.

Figure 9:
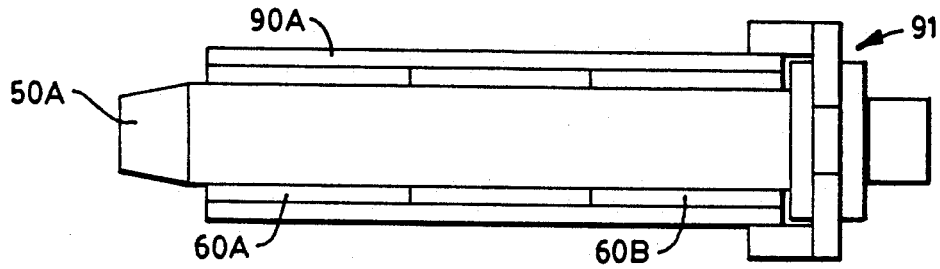
FIG. 9 is a cutaway side-view of a typical spindle configuration application of the invention.

The self compensating rotary hydrostatic bearing design, as before stated, can be applied to many types of rotating machinery. For example, in FIG. 9, two longitudinally spaced inserts 60A and 60B embodying the self-compensating hydrostatic pad pairs of bearings of FIG. 2, are assembled in a housing 90A. Each insert supports loads in a radial direction to support the shaft 50A. At one end of the shaft, there is a thrust bearing assembly 91, which may also be self-compensating. This design forms a spindle for a machine tool such as a grinder, polisher, lapper, or similar machine. Radial motion of the spindle is resisted by the confinement of the bearings 60A and 60B, the longitudinal spacing of which also provides translational pitch and yaw constraint, and the thrust bearing 91 provides axial restraint. This results in purely rotational spindle operation.

Figure 10:
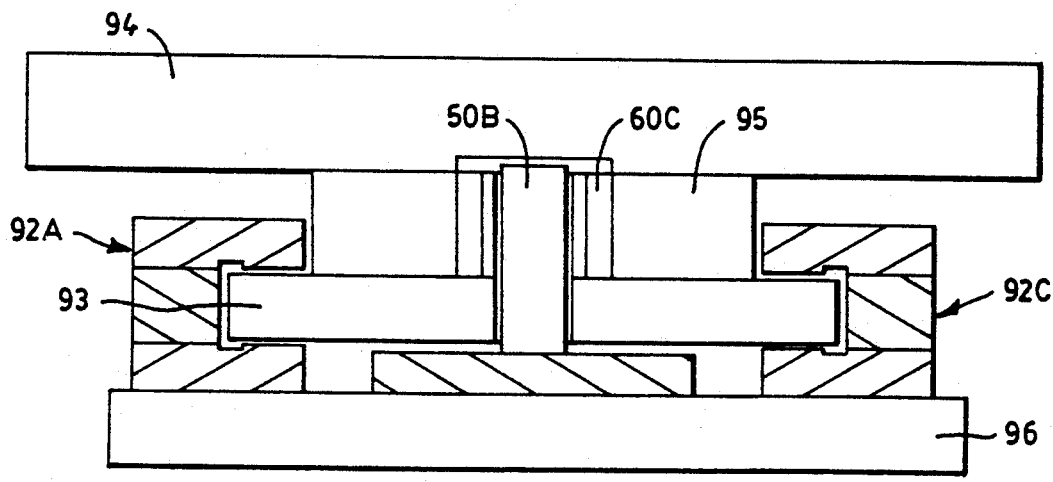
FIG. 10 is a cutaway side-view of a typical rotary table configuration application.

FIG. 10, on the other hand, shows an application of the invention to a rotary table. The table top 94 is connected to a thrust plate 93 by a spacer 95. Radial forces on the table are transferred from the table top 94 to the spacer 95 and thence to the self-compensating hydrostatic bearing pad pair insert 60C of the invention supporting the shaft 50B which is attached to the machine base 96. Axial forces and tilt moments on the table are resisted by three or more modular self-compensating bearing blocks, as of the linear self-compensating type described in said patent application, two of which, 92A and 92C, are shown in cross section.

In recapitulation, the objectives of the invention are thus attained, generally, in a mechanism providing smooth accurate rotary motion by means of one or more bearing pad pair inserts 60 which guides the motion of a shaft 50 about and/or along an axis. The bearing inserts 60 are kept from making mechanical contact with the shaft 50 by the thin film of pressurized fluid that flows from sets of opposed recess pockets 62A, 62B, 62C, and 62D in selected cylindrical surfaces of the inserts that surround the shaft 50. The flow of fluid to the pockets is regulated to allow a differential pressure to be established between the pockets, thereby compensating for changes in applied loads to the housing. This fluid flow regulation is provided by applying pressurized fluid in the annular recess grooves (65A, 65B, 65C, and 65D) from which fluid flows to respective feedholes (67A, 67B, 67C, and 67D) in the center of the annulus, connected by means of respective passageways (69A, 69B, 69C, and 69D) to the corresponding bearing pockets (62C, 62D, 62A, and 62B) located on the opposite side of the shaft from the feedholes, where the entrance angle from the passageway to the pocket is selected so that the flow is not caused to double-back on itself by the motion of the shaft, thus admirably avoiding turbulence. If turbulence were not so avoided, then heat generation could increase by an order of magnitude or more, and the bearing would be rendered useless.

Figure 5:
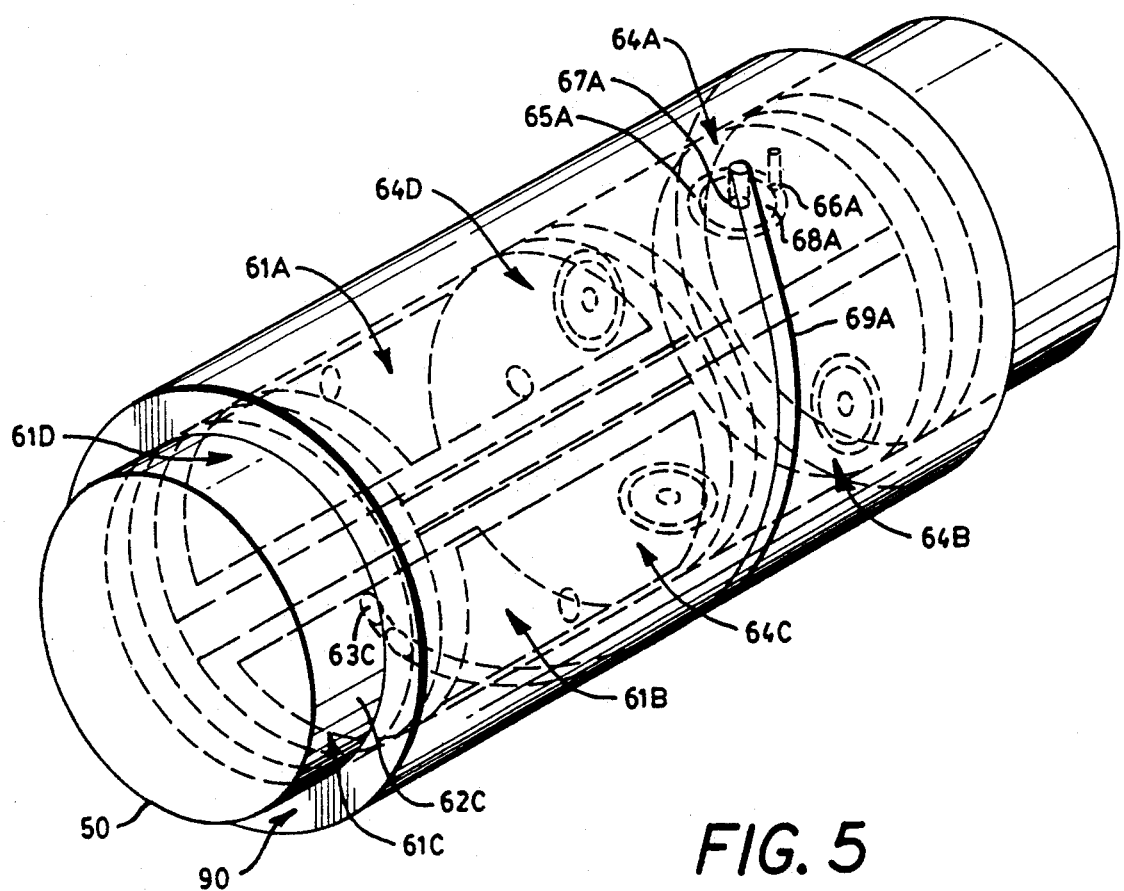
FIG. 5 is a partial isometric view of the system of the insert of FIGS. 1-3, which for purpose of clarity, shows only one of the spiral-shaped passageways from a compensation unit to a corresponding opposed pocket.

Because of the robustness of the self-compensating hydrostatic or fluidstatic bearing design of the invention and its deterministic nature, moreover, it is especially suited to implementation in modular form as illustrated in FIGS. 5 and 6. The use of ceramic components admirably invites the use of water as the fluid. When desired, however, other pressurized fluids than water, including oil and other fluids, even air or gas, may also be employed. Further modifications of the invention will also occur to persons skilled in the art, and all such are deemed to fall within the spirit and scope of the invention as defined by the appended claims.

What is claimed is:

1. In a fluidstatic bearing having opposed cylindrical housing bearing surface sections concentrically surrounding a cylindrical shaft extending coaxially therealong and therebetween, with each cylindrical bearing surface section having similar and symmetrical pockets in the surface from which pressure fluid emanates to provide a thin film interposed in the gaps between the shaft and the housing surfaces, a method of self-compensating for load variation in a radial direction on the bearing, that comprises, introducing on each cylindrical bearing surface section, longitudinally spaced from the corresponding pocket, a pressurized fluid-receiving groove of analytically representable geometry from which the fluid is fed externally of said surfaces from each groove to the pocket of the oppositely disposed surface, with the resistance to fluid flow out of the groove being adjusted to equal a proportion of the resistance to fluid flow out of the opposite surface pocket when the bearing is at nominal equilibrium position and gap, unloaded by external forces, whereby as external forces are applied, the fluid flow is regulated to self-compensate for the load proportionately to variation in the bearing gap caused by the applied load, with differential pressure being established in the opposite pockets to compensate for such applied load, and with the shaft being rotable and/or longitudinally movable within the bearing, and wherein for high speed applications the fluid introduced into said pockets is fed through a passageway that intersects said pocket at an angle that directs the flow substantially in the direction of bearing motion, such introduction of the fluid at an angle substantially tangent to said shaft acting to minimize the chance for occurrence of turbulence at high speed.

2. A method as claimed in claim 1 and in which each groove is formed in substantially circular annular form, with the pressurized fluid fed therein flowing over a surface land within the circle and into a substantially center aperture for feeding into the pocket of the oppositely disposed bearing surface.

3. A method as claimed in claim 1 and in which circumferential and axial grooves are formed between the pocket and the first-named groove on each said surface to exit leakage flow external of the first-named groove.

4. A method as claimed in claim 1 and in which a second similar bearing is axially displaced along the shaft to support the shaft with two degrees of rotational and two degrees of translational restraint.

5. A method as claimed in claim 4 and in which the shaft is further restrained against thrust, enabling the shaft to operate as an accurate spindle.

6. A method as claimed in claim 1 and in which the shaft supports a rotary table and the table is restrained from tilt motion.

7. A hydrostatic bearing assembly comprising a cylindrical shaft and a concentrically surrounding bearing housing that transfers radial forces, without mechanical contact, between the said shaft and the housing by two pairs of opposed pressurized bearing pockets of fluid filling the gap therebetween wherein the fluid flow to a cylindrical bearing pocket on one region of the shaft is regulated by a bearing cylindrical compensation section located at a region of the shaft opposite to said pocket, such that displacements of the bearing caused by applied loads cause the bearing gap to decrease in the region of said pocket, in turn causing the bearing gap to increase in the region of said fluid flow compensation section; said compensation section comprising a central depressed aperture region that is connected to said pocket, an elevated land region that surrounds said central aperture depressed region, an annular depressed groove pressure source region that surrounds said land region and which is connected to a fluid pressure source such that fluid flow is regulated from the said groove pressure source region to the said central depressed aperture region by the gap and the size and shape of the said land region, said groove pressure source region being prevented from leaking fluid to the outside by a large elevated land region surrounding said groove pressure source region, and in which the connection from said compensation section to said pocket, is made at an angle that directs the flow in a direction substantially tangent to the said shaft and generally in the direction of surface velocity vector of said shaft.

8. A fluidstatic bearing as claimed in claim 7 and in which the bearing pockets are provided with corresponding pressurized fluid-receiving grooves of substantially circular annular contours when projected onto a plane.

9. A fluidstatic bearing as claimed in claim 8 and in which a circular land surface is enclosed by each circular annular groove and over which the pressurized fluid from such groove flows into a substantially central aperture for feeding into the pocket of the oppositely disposed bearing surface.

10. A fluidstatic bearing as claimed in claim 9 and in which the pressurized-fluid applying means feeds the fluid from a source to an aperture within the circular annular groove.

11. A fluidstatic bearing as claimed in claim 9 and in which a further groove is provided transversely extending across each bearing surface between the corresponding pocket and circular annular groove for exiting fluid leakage flow along said surface to the circular annular groove.

12. A fluidstatic bearing as claimed in claim 11 and in which, on the opposite side of said pocket from the circular annular groove, a further transversely extending groove is also provided.

13. A fluidstatic bearing as claimed in claim 7 wherein said bearing provides radial restraint of the shaft.

14. A fluidstatic bearing as claimed in claim 7 wherein said bearing is supplemented by a further similar bearing disposed along the shaft to provide both radial and pitch and yaw restraint thereof.

15. A fluidstatic bearing as claimed in claim 14 wherein the shaft is provided with a thrust bearing, enabling accurate spindle operation.

16. A fluidstatic bearing as claimed in claim 7 wherein the shaft supports a rotary table and means is provided for restraining the same from tilt motion.

17. A fluidstatic bearing as claimed in claim 16 wherein the tilt restraining means comprises thrust bearing means.

18. A hydrostatic bearing assembly, as claimed in claim 7 and in which said angle is from about 30 to about 60 degrees.

19. A hydrostatic bearing assembly as claimed in claim 7 and in which a second similar bearing is provided axially displaced along the shaft for supporting and guiding the same.

20. A hydrostatic bearing assembly as claimed in claim 19 and in which a thrust bearing is provided for the shaft, enabling the assembly to operate as a spindle.

21. A hydrostatic bearing assembly, as claimed in claim 7 and in which an end of the shaft supports a rotary table, and means is provided for restraining the same against tilting.

22. A hydrostatic bearing as claimed in claim 7 and in which the fluid is water.

23. A hydrostatic bearing assembly comprising a cylindrical shaft and a concentrically surrounding bearing housing that transfers radial forces, without mechanical contact, between the said shaft and the housing by two pairs of opposed pressurized bearing pockets of fluid filling the gap therebetween wherein the fluid flow to a cylindrical bearing pocket on one region of the shaft is regulated by a bearing cylindrical compensation section located at a region of the shaft opposite to said pocket, such that displacements of the bearing caused by applied loads cause the bearing gap to decrease in the region of said pocket, in turn causing the bearing gap to increase in the region of said fluid flow compensation section; said compensation section comprising a central depressed region, an annular depressed groove pressure source region that surrounds said land region and which is connected to a fluid pressure source such that fluid flow is regulated from the said groove pressure source region to the said central depressed aperture region by the gap and the size and shape of the said land region, said groove pressure source region being prevented from leaking fluid to the outside by a large elevated land region surrounding said groove pressure source region, and in which means is provided for switching the direction of fluid flow to the pockets to enable bidirectional operation of the shaft.

* * * * *